(No Model.) 2 Sheets—Sheet 1.
T. FAULDER.
CLAMPING DEVICE FOR VEHICLE SEATS.
No. 486,636. Patented Nov. 22, 1892.
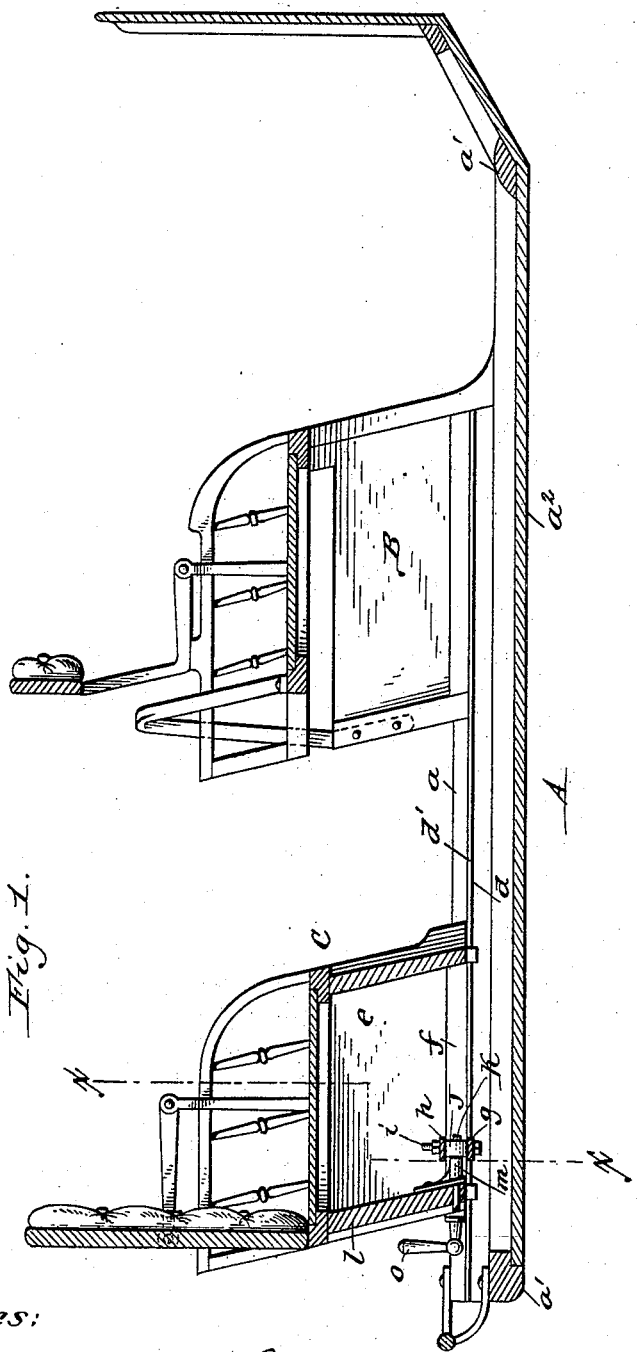
Witnesses:
Theo. L. Popp
H. S. Hammond
Thomas Faulder — Inventor.
By Wilhelm & Bonner
Attorneys.

(No Model.) 2 Sheets—Sheet 2.
T. FAULDER.
CLAMPING DEVICE FOR VEHICLE SEATS.
No. 486,636. Patented Nov. 22, 1892.
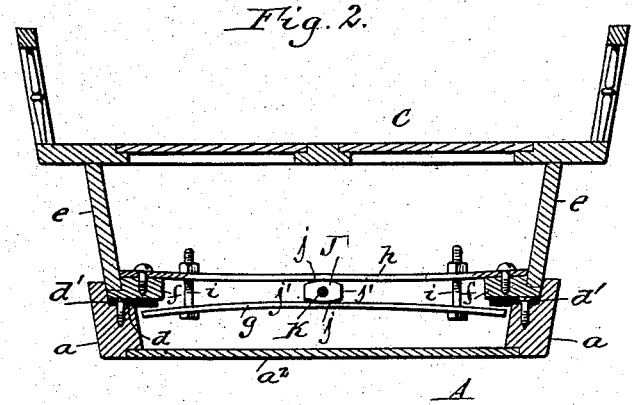
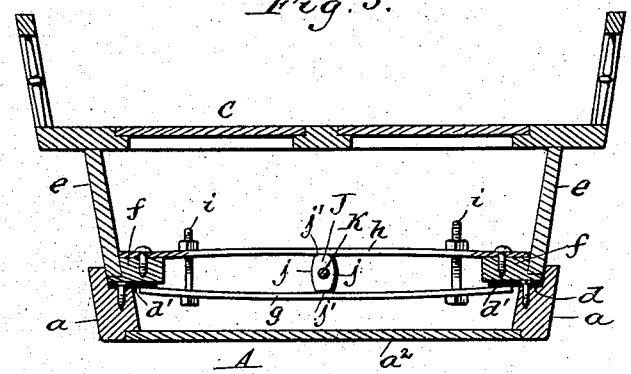
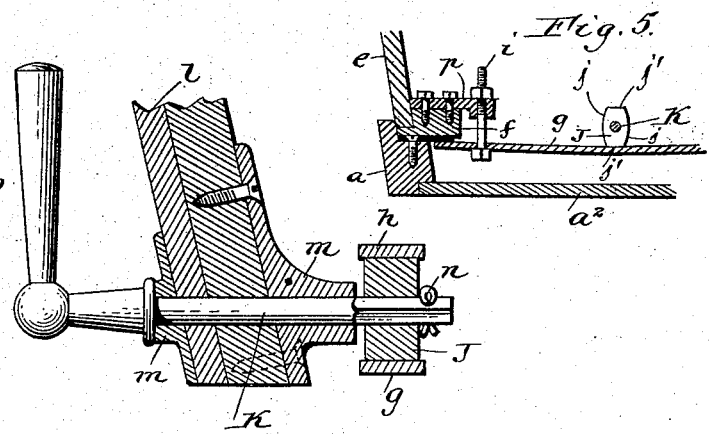
Witnesses:
Theo. L. Popp
H. D. Hammond
Thomas Faulder Inventor.
By Wilhelm & Bonner
Attorneys.

UNITED STATES PATENT OFFICE.

THOMAS FAULDER, OF SYRACUSE, NEW YORK, ASSIGNOR TO CHRISTOPHER C. BRADLEY, OF SAME PLACE.

CLAMPING DEVICE FOR VEHICLE-SEATS.

SPECIFICATION forming part of Letters Patent No. 486,636, dated November 22, 1892.

Application filed March 16, 1892. Serial No. 425,120. (No model.)

*To all whom it may concern:*

Be it known that I, THOMAS FAULDER, a citizen of the United States, residing at Syracuse, in the county of Onondaga and State of New York, have invented a new and useful Improvement in Clamping Devices for Vehicle-Seats, of which the following is a specification.

This invention relates to that class of vehicles which are provided with a stationary seat and a movable seat, which latter can be shifted, so as to produce a one-seated or a two-seated vehicle.

The object of my invention is to provide a simple clamping device which can be easily operated and whereby the movable seat is securely held in its adjusted position.

In the accompanying drawings, consisting of two sheets, Figure 1 is a longitudinal sectional elevation of a vehicle provided with my improved seat-clamping device. Fig. 2 is a vertical cross-section in line $xx$, Fig. 1, showing the seat-clamp in its unlocked position. Fig. 3 is a similar section showing the seat-clamp in its locked position. Fig. 4 is a longitudinal section, on an enlarged scale, of the clamping-cam and connecting parts. Fig. 5 is a fragmentary cross-section of the body and rear seat, showing a modified form of the supporting-bar.

Like letters of reference refer to like parts in the several figures.

A represents the body of the vehicle, which consists, essentially, of the longitudinal side sills $a$, the cross-sills $a'$, and the bottom $a^2$.

B represents the stationary front seat, mounted upon the front portion of the body and having its rear side open, forming a box.

C represents the movable rear seat, arranged upon the rear portion of the body when two seats are desired and which can be telescoped into the front seat in the usual manner when it is desired to produce the appearance of a one-seated vehicle. The inner upper edges of both side sills are cut down and form longitudinal ledges $d$, extending from the rear ends of these sills to the front end of the front seat.

$d'$ represents metallic runner plates or rails, which are secured upon these ledges and project inwardly, so as to overhang the inner sides of the side sills. The side boards $e$ of the movable seat are provided at their lower ends with sliding blocks $f$, which rest upon the runner-plates and bear against the outer raised portions of the side sills, thereby holding the rear seat against lateral movement.

$g$ represents a transverse clamping-bar, which is adapted to bear with its ends against the under sides of the overhanging portions of the runner-plates and hold the rear seat against lengthwise movement. $h$ represents a supporting-bar arranged above the clamping-bar and secured with its ends upon the sliding blocks. The clamping-bar is loosely connected near its ends with the supporting-bar by vertical bolts $i$. The clamping and supporting bars are preferably constructed of metal having a moderate amount of elasticity. In the unlocked position of the clamping-bar it is bent upwardly at its middle and its ends are disengaged from the runner-plates, as represented in Fig. 2, which permits the rear seat to be moved freely lengthwise. Upon depressing the middle portion of the clamping-bar its ends are raised, owing to the fulcra formed by the bolts $i$, and bear against the under sides of the runner-plates, as represented in Fig. 3, thereby holding the rear seat against lengthwise movement.

J represents an elongated or oval-shaped clamping-cam whereby the middle portion of the clamping-bar is depressed for the purpose of locking the rear seat in position. This cam is arranged between the supporting and clamping bars and provided with two curved cam-faces $j$ on its long sides and two flat or abrupt faces $j'$ at its ends. When the clamping-bar is unlocked, as represented in Fig. 2, the cam is arranged with its long side horizontally and bears with its curved faces against the clamping and supporting bars and is held in this position by the constant pressure which these bars exert upon the cam. Upon turning the cam so that its long side is in a vertical position the middle portions of the supporting and clamping bars are respectively raised and depressed and the flat faces of the cam are brought against the bars. This causes the ends of the clamping-bar to rise and bear against the runner-plates, and the tension of both bars against the flat faces of the cam holds the latter in its locked position.

K represents a horizontal spindle or shank, which supports the cam. This shank passes lengthwise through the rear end board $l$ of the rear seat and is journaled in bearings $m$, secured to said board. The front end of the shank is flat-sided and the cam is provided with a correspondingly-flat-sided opening, which receives the front end of the shank and is secured thereto by a spring-key $n$. The rear end of the shank is provided with a handle $o$, whereby the cam is operated.

If desired, the transverse supporting-bar may be replaced by brackets $p$, which are secured to the side blocks $f$ of the seat, as represented in Fig. 5, and which carry the bolts or other supports which form the fulcra near the ends of the clamping-bar. In this modified construction the brackets are practically non-elastic and serve merely to support the bolts, while in the preferred construction the supporting-bar is elastic and draws upon the bolt when the two bars are sprung apart.

I claim as my invention—

1. The combination, with the vehicle-body provided with side runners, of a movable seat, a transverse clamping-bar attached to the seat and adapted to bear with its ends against said runners, and a cam whereby said clamping-bar is tightened against the runners, substantially as set forth.

2. The combination, with the vehicle-body having longitudinal runners, of a movable seat, a transverse clamping-bar adapted to bear with its ends against said runners, a clamping-cam bearing against the middle portion of said clamping-bar, and supports attached to the seat and arranged between the cam and the ends of the clamping-bar, substantially as set forth.

3. The combination, with the vehicle-body having runners which overhang the inner sides of the body, of a movable seat, a transverse clamping-bar arranged with its ends underneath said runners, a transverse supporting-bar secured with its ends to the seat and connected with the clamping-bar, and a cam arranged between the supporting and clamping bars and bearing against the same, substantially as set forth.

4. The combination, with the vehicle-body having longitudinal runners which overhang the inner sides of the body, of a movable seat, a transverse clamping-bar arranged with its ends underneath the runners, a transverse supporting-bar secured with its ends to the seat, an elongated cam journaled in the rear board of the movable seat and arranged between the middle portions of the clamping and supporting bars, and bolts connecting the clamping-bar with the supporting-bar between the cam and the ends of said bars, substantially as set forth.

Witness my hand this 10th day of March, 1892.

THOMAS FAULDER.

Witnesses:
C. C. BRADLEY,
JAS. MANNING.